US012209209B2

(12) United States Patent
Takashima et al.

(10) Patent No.: US 12,209,209 B2
(45) Date of Patent: Jan. 28, 2025

(54) METHOD OF PRODUCING BONDED BODY AND BONDED BODY

(71) Applicant: NITTO DENKO CORPORATION, Ibaraki (JP)

(72) Inventors: Atsushi Takashima, Ibaraki (JP); Ginji Mizuhara, Ibaraki (JP); Hiromitsu Morishita, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 829 days.

(21) Appl. No.: 17/282,530

(22) PCT Filed: Oct. 3, 2019

(86) PCT No.: PCT/JP2019/039200
§ 371 (c)(1),
(2) Date: Apr. 2, 2021

(87) PCT Pub. No.: WO2020/071509
PCT Pub. Date: Apr. 9, 2020

(65) Prior Publication Data
US 2021/0388237 A1 Dec. 16, 2021

(30) Foreign Application Priority Data

Oct. 5, 2018 (JP) .................................. 2018-190115
Sep. 30, 2019 (JP) .................................. 2019-179324

(51) Int. Cl.
*C09J 7/21* (2018.01)
*B32B 7/12* (2006.01)
(Continued)

(52) U.S. Cl.
CPC . *C09J 7/21* (2018.01); *C09J 5/00* (2013.01); *C09J 7/385* (2018.01); *C09J 133/08* (2013.01);
(Continued)

(58) Field of Classification Search
CPC ........ C09J 7/21; C09J 7/385; C09J 2203/326; C09J 2400/263; C09J 2301/16; B32B 7/12
See application file for complete search history.

(56) References Cited

U.S. PATENT DOCUMENTS 4,584,227 A    4/1986 Darjee et al.
2015/0030797 A1*  1/2015 Seo .......................... B32B 5/26
                                                         264/10
(Continued)

FOREIGN PATENT DOCUMENTS

EP    3 689 991 A1    8/2020
EP    3 757 185 A1    12/2020
(Continued)

OTHER PUBLICATIONS

Office Action issued on Mar. 29, 2023 for corresponding Chinese Patent Application No. 201980065634.6, along with an English translation (9 pages).

(Continued)

*Primary Examiner* — Joanna Pleszczynska
(74) *Attorney, Agent, or Firm* — Hauptman Ham, LLP

(57) ABSTRACT

The present invention relates to a method of producing a bonded body in which members are allowed to bond to each other with a yarn-like adhesive body, and at least a part of a bonding region, which is a portion where members are allowed to bond to each other, has a bent shape, and the members are allowed to bond to each other with the yarn-like adhesive body bent according to a shape of the bonding region.

12 Claims, 3 Drawing Sheets

(51) Int. Cl.
  *B32B 37/00* (2006.01)
  *B32B 37/10* (2006.01)
  *B32B 37/12* (2006.01)
  *C09J 5/00* (2006.01)
  *C09J 7/38* (2018.01)
  *C09J 133/08* (2006.01)
  *D06M 15/263* (2006.01)
  *D06M 101/32* (2006.01)

(52) U.S. Cl.
  CPC ...... *D06M 15/263* (2013.01); *C09J 2203/326* (2013.01); *C09J 2400/263* (2013.01); *C09J 2433/00* (2013.01); *C09J 2433/008* (2013.01); *C09J 2467/006* (2013.01); *C09J 2469/008* (2013.01); *D06M 2101/32* (2013.01)

(56) References Cited

U.S. PATENT DOCUMENTS

| | | | | |
|---|---|---|---|---|
| 2015/0086767 | A1* | 3/2015 | Komatsuzaki | C09J 7/26 428/315.7 |
| 2016/0108292 | A1* | 4/2016 | Yamakami | C09J 7/29 428/220 |
| 2016/0280847 | A1* | 9/2016 | Müssig | C09J 7/405 |
| 2018/0265750 | A1 | 9/2018 | Akamatsu et al. | |
| 2020/0263065 | A1 | 8/2020 | Takashima et al. | |
| 2021/0009864 | A1 | 1/2021 | Takashima et al. | |

FOREIGN PATENT DOCUMENTS

| | | |
|---|---|---|
| JP | S54-161650 A | 12/1979 |
| JP | S61-159380 A | 7/1986 |
| JP | H1-308471 A | 12/1989 |
| JP | H3-231980 A | 10/1991 |
| JP | H4-76080 A | 3/1992 |
| JP | 2001-161238 A | 6/2001 |
| JP | 2006-104298 A | 4/2006 |
| JP | 2006-182838 A | 7/2006 |
| JP | 2006-274492 A | 10/2006 |
| JP | 2007-138309 A | 6/2007 |
| JP | 2015-209446 A | 11/2015 |
| JP | 2018-44139 A | 3/2018 |
| WO | 2017/064925 A1 | 4/2017 |
| WO | 2019/065886 A1 | 4/2019 |
| WO | 2019/163788 A1 | 8/2019 |

OTHER PUBLICATIONS

Extended European Search Report issued on Jun. 8, 2022 for corresponding European Patent Application No. 19869582.7 (7 pages).
Office Action issued on Oct. 24, 2023 for corresponding Japanese Patent Application No. 2019-179321, along with an English machine translation (7 pages).
Office Action issued on Oct. 24, 2023 for corresponding Japanese Patent Application No. 2019-179324, along with an English machine translation (7 pages).
Rejection Decision issued on Jul. 29, 2023 for corresponding Chinese Patent Application No. 201980065634.6, along with an English translation (8 pages).
International Search Report issued for corresponding International Patent Application No. PCT/JP2019/039200 on Nov. 26, 2019, along with an English translation.
Written Opinion issued for corresponding International Patent Application No. PCT/JP2019/039200 on Nov. 26, 2019.
Office Action issued on Aug. 24, 2022 for corresponding Chinese Patent Application No. 201980065634.6, along with an English translation (13 pages).
Office Action issued on Oct. 14, 2022 for corresponding Taiwanese Patent Application No. 108136099, along with an English translation (10 pages).
Information Offer Form issued on Oct. 28, 2022 for corresponding Japanese Patent Application No. 2019-179321, along with an English translation (13 pages).
Decision of Refusal issued on Jan. 16, 2024 for corresponding Japanese Patent Application No. 2019-179324, along with an English machine translation (4 pages).
Office Action issued on Mar. 12, 2024 for corresponding Japan Patent Application No. 2019-179321, along with an English translation (5 pages).
Office Action issued on Feb. 24, 2024 for corresponding Korean Patent Application No. 10-2021-7009952, along with an English translation (7 pages).
Office Action issued on Nov. 27, 2024 for corresponding Korean Patent Application No. 10-2021-7009952, along with an English machine translation (9 pages).

* cited by examiner

METHOD OF PRODUCING BONDED BODY AND BONDED BODY

CROSS REFERENCE TO RELATED APPLICATION

This application is a National Stage of International Application No. PCT/JP2019/039200, filed on Oct. 3, 2019, which designates the United States and was published in Japan, and which is based upon and claims priority to Japanese Patent Application Nos. 1) 2018-190115, filed on Oct. 5, 2018; and 2) 2019-179324, filed on Sep. 30, 2019 in the Japan Patent Office. All of the aforementioned applications are hereby incorporated by reference in their entireties.

TECHNICAL FIELD

The present invention relates to a method for producing a bonded body and a bonded body.

BACKGROUND ART

When articles are allowed to bond to each other, a shaped adhesive body (for example, a double-sided adhesive tape) may be used instead of a liquid adhesive in view of a request for prevention of dripping or improvement in workability.

Further, when articles are allowed to bond to each other by using an adhesive body, a portion where the articles are allowed to bond to each other via the adhesive body (hereinafter, also referred to as "bonding region") is required to have various shape according to the articles allowed to bond to each other.

For example, in an electronic device such as a smartphone, in view of a request for reduction in size or a request for design, the bonding region may be required to be narrow when articles constituting the electronic device are allowed to bond to each other.

For example, when a cover glass of a smartphone is to be fixed, the bonding region is particularly required to be narrow for getting bezel less or the like.

Further, the bonding region may be required to have a complicated shape such as a bent shape according to the shape of the articles allowed to bond to each other.

For the requirement for narrowing the bonding region, one option is to cut the double-sided adhesive tape finely and use the cut double-sided adhesive tapes, but the narrowing is limited in this method. Further, when the width of the double-sided adhesive tape is narrowed, the front and back sides are likely to be twisted and the handleability may be deteriorated. The double-sided adhesive tape has a problem that it is not suitable for sticking a bent shape. Due to such a problem, the method of cutting finely and using the cut double-sided adhesive tapes cannot sufficiently meet the demand for diversification of the shape of the bonding region.

Examples of the method for meeting the demand for diversification of the shape of the bonding region include a method of cutting a double-sided adhesive film into a desired shape by punching.

For example, Patent Literature 1 discloses an adhesive film having excellent cuttability, that is, an adhesive film in which when an adhesive film is cut, an adhesive is suppressed from being stringy.

CITATION LIST

Patent Literature

Patent Literature 1: WO 2017/064925

SUMMARY OF INVENTION

Technical Problem

However, the method of punching the double-sided adhesive film causes a problem of increasing a discarded portion with respect to an amount of the obtained adhesive body and thus has a problem that an environmental load is large. In recent years, reduction of the environmental load has been required in order to realize a sustainable society, but the method of punching a double-sided adhesive film cannot meet this demand.

The present invention has been made in view of the above, and an object of the present invention is to provide a method of producing a bonded body in which members are allowed to bond to each other, which can deal with diversification of the shape of the bonding region and has a low environmental load.

Another object of the present invention is to provide a bonded body produced by the method.

Solution to Problem

A method of producing a bonded body according to the present invention for solving the above problems is a method of producing a bonded body including allowing members to bond to each other with a yarn-like adhesive body, wherein at least a part of a bonding region, which is a portion where the members are allowed to bond to each other, has a bent shape, and the members are allowed to bond to each other with the yarn-like adhesive body bent according to a shape of the bonding region.

In one embodiment of the method of producing a bonded body according to the present invention, the yarn-like adhesive body has an adhesive force of 5 N/22 cm or more measured by the test described in the specification.

In one embodiment of the method of producing a bonded body according to the present invention, the members are members constituting an electronic device.

A bonded body according to the present invention for solving the above problems is a bonded body in which members are allowed to bond to each other with a yarn-like adhesive body, in which at least a part of a bonding region, which is a portion where the members are allowed to bond to each other, has a bent shape, and in which the members are allowed to bond to each other using the yarn-like adhesive body bent according to a shape of the bonding region.

In one embodiment of the bonded body according to the present invention, the yarn-like adhesive body has an adhesive force of 5 N/22 cm or more measured by the test by the test described in the specification.

In one embodiment of the bonded body according to the present invention, the members are members constituting an electronic device.

Advantageous Effects of Invention

The method of producing the bonded body of the present invention can deal with diversification of the shape of the bonding region, and has a low environmental load.

DESCRIPTION OF EMBODIMENTS

Figure 1:
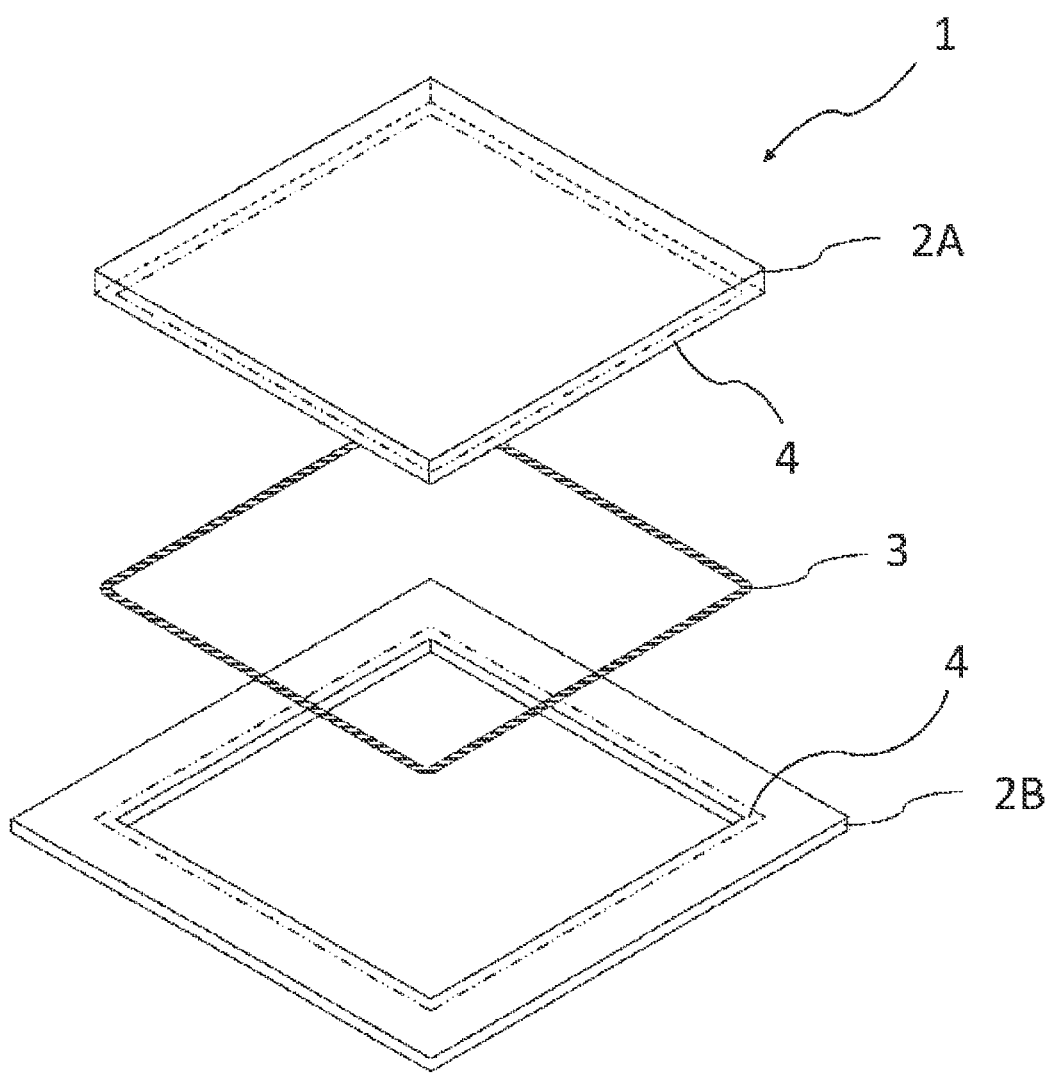
FIG. 1 is an exploded perspective view of a bonded body according to one embodiment of the present invention.

An exploded perspective view of a bonded body according to an embodiment of the present invention is illustrated in FIG. 1.

The method of producing a bonded body 1 according to the embodiment of the present invention is a method of producing the bonded body 1 in which members (members 2A, 2B) are allowed to bond to each other with a yarn-like adhesive body 3, at least a part of a bonding region 4, which is a portion where the members are allowed to bond to each other, has a bent shape, and the members are allowed to bond to each other with the yarn-like adhesive body 3 bent according to a shape of the bonding region 4.

The bonded body 1 according to the embodiment of the present invention is a bonded body 1 in which members (members 2A, 2B) are allowed to bond to each other with a yarn-like adhesive body 3, at least a part of a bonding region 4, which is a portion where members are allowed to bond to each other, has a bent shape, and the members are allowed to bond to each other with the yarn-like adhesive body 3 bent according to a shape of the bonding region 4.

Hereinafter, embodiments of a method of producing a bonded body and a bonded body of the present invention will be described in detail.

The present invention is not limited to the embodiments to be described below. In the drawings, members and portions having the same functions may be denoted by the same reference numerals, and duplicate descriptions may be omitted or simplified. The embodiments described in the drawings are schematized for the purpose of clearly explaining the present invention, and do not necessarily accurately represent the size or scale of an actual product.

[Yarn-Like Adhesive Body]

First, a yarn-like adhesive body used in the method of producing a bonded body of the present embodiment will be described in detail.

The yarn-like shape means a shape in which a length in the longitudinal direction is sufficiently longer than a length in the width direction, and means that in the shape of the cross section perpendicular to the longitudinal direction (hereinafter, also referred to as "cross-sectional shape"), a ratio (major axis/minor axis) of a length of a major axis (the longest axis that passes through the center of gravity of the cross-sectional shape) to a length of a minor axis (the shortest axis that passes through the center of gravity of the cross-sectional shape) is, for example, 200 or less, preferably 100 or less, more preferably 50 or less, further more preferably 10 or less, still further more preferably 5 or less, and particularly preferably 3 or less; and also means that it can be bent in various directions and angles like a yarn.

The yarn-like adhesive body can be bent in various directions and angles as mentioned above and thus the yarn-like adhesive body can be bent according to the shape of the bonding region, and this allows for dealing with diversification of the shape of the bonding region.

In addition, the use of a yarn-like adhesive body eliminates the generation of a discarded portion, unlike the case where an adhesive body obtained by punching a double-sided adhesive film is used, so that the environmental load can also be reduced.

The cross-sectional shape of the yarn-like adhesive body is typically circular, but is not limited thereto. The cross-sectional shape may have various shapes, such as an elliptical shape or a polygonal shape, in addition to a circular shape. The length and thickness of the yarn-like adhesive body in the present embodiment are not limited, and may be appropriately adjusted depending on the intended use.

The yarn-like adhesive body may include a core material and an adhesive layer including an adhesive covering the peripheral surface of the core material, or may include only an adhesive without a core material. From the viewpoint of the strength, the handleability, and the adhesive force, the yarn-like adhesive body preferably includes a core material.

The yarn-like adhesive body including only an adhesive can be obtained, for example, by applying an adhesive linearly on a separator, and drying and heating the adhesive if necessary.

The yarn-like adhesive body including a core material can be obtained, for example, by coating an adhesive composition on the surface of the core material by dipping, immersion, application, or the like, and performing heating and drying on it if necessary. The adhesive composition can be applied with the conventional coaters such as a gravure roll coater, a reverse roll coater, a kiss roll coater, a dip roll coater, a bar coater, a knife coater, or a spray coater.

The type of the adhesive to be used is not limited, and for example, an acrylic adhesive, a rubber adhesive, a vinyl alkyl ether adhesive, a silicone adhesive, a polyester adhesive, a polyamide adhesive, a urethane adhesive, a fluorine adhesive, and an epoxy adhesive can be used. Above all, a rubber adhesive and an acrylic adhesive are preferred from the standpoint of adhesiveness, and an acrylic adhesive is particularly preferred. The adhesive may be used alone or in combination of two or more thereof.

The acrylic adhesive contains, as a main ingredient, a polymer of monomers including a (meth)acrylic acid alkyl ester such as ethyl acrylate, butyl acrylate, 2-ethylhexyl acrylate, isooctyl acrylate or isononyl acrylate as a main component, and a modifying monomer such as acrylonitrile, vinyl acetate, styrene, methyl methacrylate, acrylic acid, maleic anhydride, vinylpyrrolidone, glycidyl methacrylate, dimethyl aminoethyl methacrylate, hydroxyethyl acrylate or acrylamide, added to the main ingredient as necessary.

The rubber adhesive contains a rubber polymer such as natural rubber, a styrene-isoprene-styrene block copolymer, a styrene-butadiene-styrene block copolymer, a styrene-ethylene/butylene-styrene block copolymer, a styrene-butadiene rubber, polybutadiene, polyisoprene, polyisobutylene, butyl rubber, chloroprene rubber or silicone rubber, as a main ingredient.

Tackifying resins such as rosin type, terpene type, styrene type, aliphatic petroleum type, aromatic petroleum type, xylene type, phenol type, coumarone indene type and their hydrogenated products, and various additives such as a crosslinking agent, a viscosity regulator (such as a thickener), a leveling agent, a release modifier, a plasticizer, a softener, a filler, a coloring agent (pigment, dye or the like), a surfactant, an antistatic agent, a preservative, an age resister, an ultraviolet absorber, an antioxidant and a light stabilizer can be appropriately added to those adhesives.

As the adhesive, either a solvent-type adhesive or a water-dispersible type adhesive can be used. Here, a water-dispersible adhesive is preferable from the viewpoints that the water-dispersible adhesive can be high-speedily coated, is environmentally friendly, and the solvent has a small influence on the core material (swelling or dissolution).

From the viewpoint of the adhesive force of the yarn-like adhesive body including the core material, an adhesion amount of the adhesive which is adhered to the core material is preferably large. Specifically, the adhesion amount of the adhesive (weight of the adhesive layer per unit length) is preferably 2 mg/m or more, more preferably 5 mg/m or more, and even more preferably 8 mg/m or more. On the other hand, if the adhesion amount of the adhesive is excessive, it is necessary to apply the adhesive a plurality of times to the core material and it takes time to dry the applied adhesive in the production process, so that the production efficiency is low. Thus, the adhesion amount of the adhesive in the adhesive article of the present embodiment is preferably 200 mg/m or less, more preferably 180 mg/m or less, and even more preferably 160 mg/m or less.

A shape or material of the core material in the yarn-like adhesive body including the core material is not limited as long as the core material is a yarn-like member, and may be appropriately adjusted according to the required properties such as strength, weight, and hardness.

The cross-sectional shape of the core material is typically circular, but may have various shapes, such as an elliptical shape or a polygonal shape, in addition to a circular shape.

The core material may be a monofilament including a single filament or a multifilament including filaments, and may be a spun yarn, a processed yarn, which has been subjected to crimping or bulking and called a textured yarn, a bulky yarn and a stretch yarn, a hollow yarn, or a combined yarn obtained by twisting them together, or the like.

The thickness of the core material is not limited but may be appropriately adjusted as well as the thickness of the adhesive layer such that the thickness of the yarn-like adhesive body is appropriate according to the width of the gap.

The material of the core material may be appropriately selected according to the required properties such as strength, weight, and hardness.

Examples of the material of the core material include various types of polymer materials such as rayon, cupra, acetate, promix, nylon, aramid, vinylon, vinylidene, polyvinyl chloride, polyester, acryl, e polyethylene (PE), polypropylene (PP), polyolefin such as ethylene/propylene copolymers and ethylene/vinyl acetate copolymers, polyester such as polyethylene terephthalate (PET), vinyl chloride resins, vinyl acetate resins, polyimide resins, polyamide resins, fluororesins, polyurethane, polyclar, polylactic acid; various rubbers such as natural rubber and synthetic rubber such as polyurethane; inorganic materials such as glass, carbon materials and metals; natural materials such as cotton and wool; foam such as foamed polyurethane and foamed polychloroprene rubber; or the like.

The core material may contain various additives such as a filler (inorganic filler, organic filler or the like), an age resister, an antioxidant, a UV absorber, an antistatic agent, a lubricant, a plasticizer and, a coloring agent (pigments, dyes or the like). The known or conventional surface treatment such as corona discharge treatment, plasma treatment or application of a primer may be performed on the surface of the core material.

In the yarn-like adhesive body including the core material, the entire circumferential surface of the core material is not necessarily covered with the adhesive layer, and may have a portion that is not covered with the adhesive layer as long as the effect of the present invention is achieved. The end surface of the core material may or may not be covered with the adhesive layer. For example, when the adhesive body is cut during the producing process or before use, the end surface of the core material may not be covered with the adhesive layer.

In order to replace the conventional bonding performed by the adhesive body obtained by punching the adhesive film with the bonding with use of a yarn-like adhesive body, it is preferable that the adhesive force of the yarn-like adhesive body is high.

The adhesive force of the yarn-like adhesive body can be evaluated, for example, by the following method.

(Evaluation Method of Adhesive Force)

First, a first member and a second member as described below are prepared.

First member: A rectangular acrylic plate having a short side of 50 mm, a long side of 60 mm, and a thickness of 3 mm Second member: A rectangular polycarbonate resin plate having a short side of 80 mm, a long side of 110 mm, and a thickness of 10 mm and having a rectangular slit (a short side of 30 mm, a long side of 40 mm) in the center.

Figure 2:
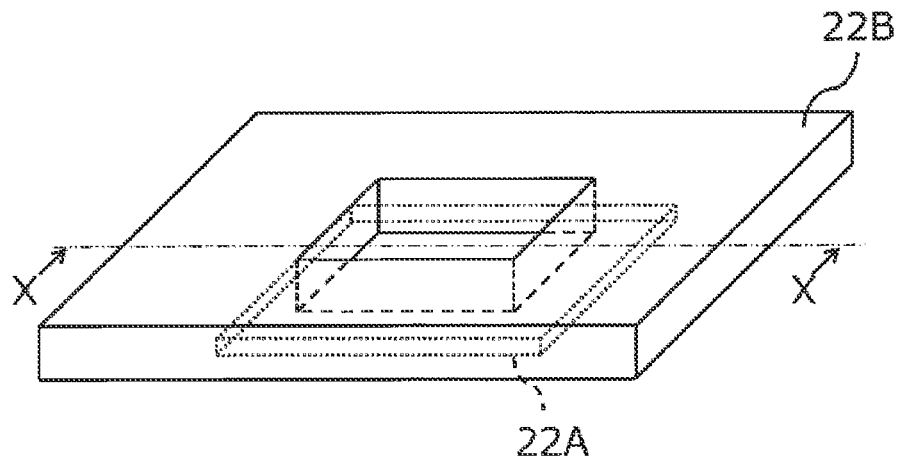
FIG. 2 is a perspective view for explaining a method of evaluating an adhesive force of an adhesive article of the present invention.

Next, the yarn-like adhesive body is stuck along a peripheral edge of one surface of the first member, and the first member and the second member are allowed to bond to each other such that the center of the first member and the center of the slit of the second member coincide with each other, and are press-bonded at 2 kg for 10 seconds to obtain a bonded body. A perspective view of the bonded body is illustrated in FIG. 2 and a cross-sectional view taken along line A-A of FIG. 2 is illustrated in FIG. 3.

Figure 3:
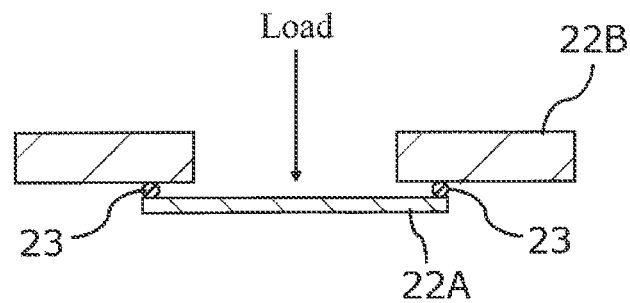
FIG. 3 is a cross-sectional view taken along line X-X in FIG. 2.

Then, the second member is fixed and, as shown in FIG. 3, a load is applied to the center of the first member through the slit in a direction in which the first member and the second member are separated, and a maximum load observed until the first member and the second member are separated is measured. The measured maximum load is referred to as an adhesive force.

The adhesive force of the yarn-like adhesive body measured by the above method is preferably 5 N/22 cm or more, more preferably 10 N/22 cm or more, further more preferably 15 N/22 cm or more, still more preferably 20 N/22 cm or more, and particularly preferably 25 N/22 cm or more.

In order to achieve a high adhesive force, it is particularly preferable that the yarn-like adhesive body includes a multifilament yarn as a core material.

The adhesive force when articles are allowed to bond to each other by the yarn-like adhesive body (difficulty in debonding articles) is greatly affected by the contact area between the yarn-like adhesive body and the article.

Figure 4:
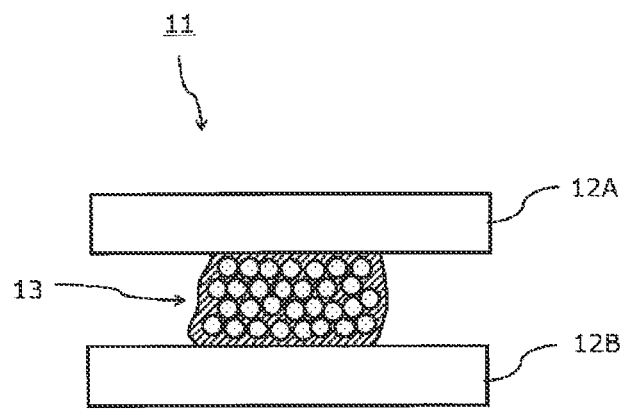
FIG. 4 is a schematic view illustrating a state in which adherends are allowed to bond to each other with an adhesive article including a core material made of multifilament yarn.

FIG. 4 illustrates a schematic view of a bonded body 11 in which an article 12A and an article 12B are allowed to bond to each other using a yarn-like adhesive body 13 including a core material made of a multifilament yarn. Allowing the articles to bond to each other by using the yarn-like adhesive body 13 having a multifilament yarn as a core material allows for achieving a high adhesive force because each of the filaments constituting the core material spreads so as to be loosened, the core material deforms so as to crush, and thus the article 12A and the article 12B can have a wide contact area with the yarn-like adhesive body.

For the above reasons, the yarn-like adhesive body 13 including a multifilament yarn as the core material exhibits a higher adhesive force as compared with an adhesive article including a core material made of a monofilament having the same thickness (fineness) of the core material of the yarn-like adhesive body 13.

When the multifilament yarn is used as the core material, the number of filaments constituting the multifilament is preferably 4 or more, more preferably 10 or more, further more preferably 15 or more, and particularly preferably 20 or more from the viewpoint of adhesive force.

On the other hand, when the thickness (fineness) of the core material is kept at the same level, when the number of filaments constituting the core material increases, each filament becomes thinner (fineness decreases). If the filaments are too thin, the strength of the core material may be reduced or the handling property may be deteriorated. Thus, the number of filaments constituting the core material is preferably 300 or less.

In addition, the multifilament yarn in the present embodiment may be a twisted yarn or a non-twisted yarn. That is, the multifilament yarn in the present embodiment may have a twist number of more than 0 times/m or 0 times/m. In addition, the multifilament yarn according to the present embodiment may be a bundle in which multifilaments, which may be a twisted yarn or non-twisted yarn, are twisted, or a bundle in which multifilaments, which may be a twisted yarn or non-twisted yarn, are not twisted.

Figure 5:
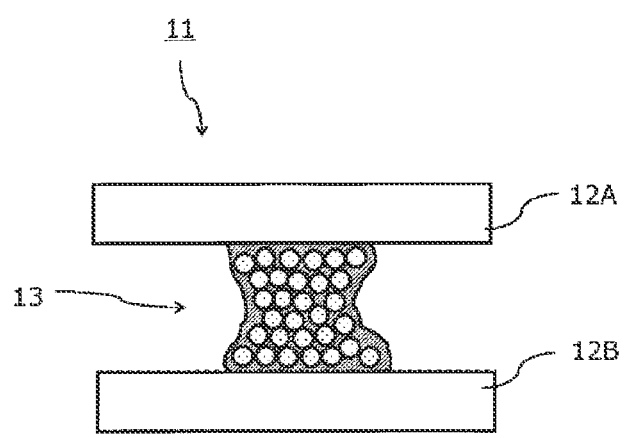
FIG. 5 is a schematic view illustrating a state in which the adherends are allowed to bond to each other with an adhesive article including a core material made of multifilament yarn.

When a force is applied in a direction in which the articles allowed to bond to each other with the yarn-like adhesive body including the multifilament yarn as a core material according to the present embodiment are debonded, each of the filaments spreads as shown in FIG. 5, and the core material is deformed so as to extend in a direction parallel to the applied force in the thickness direction (direction perpendicular to the longitudinal direction). However, if the shape of the core material is excessively distorted at this time, stress is concentrated in the distorted portion, and the portion is likely to be a starting point of debonding. Thus, the filaments constituting the core material are preferably grouped together to some extent for achieving even more excellent adhesive force. As described above, the core material may be a non-twisted yarn or a twisted yarn. The core material is preferably twisted for allowing each of the filaments constituting the core material to be grouped together to some extent. Specifically, the twist number of the core material is preferably 30 times/m or more, more preferably 60 times/m or more, and even more preferably 90 times/m or more.

On the other hand, the twist of the core material is preferably not too tight for allowing the core material to sufficiently deform when articles are allowed to bond to each other and for increasing the adhesion amount of the adhesive per unit length. Thus, the twist number of the core material is preferably 3000 times/m or less, more preferably 1500 times/m or less, even more preferably 800 times/m or less, and particularly preferably 250 times/m or less.

When the core material is twisted, it is preferable to control the twist coefficient represented by the following formula (A) from the same viewpoint as described above. The twist coefficient is an index for discussing the influence (influence on the grouping of the core material, ease of deformation, the adhesion amount of the adhesive, and the like) of twist regardless of the thickness of the core material.

That is, the influence of the twist number on the core material varies depending on the thickness of the core material, but the same twist coefficient influences on the core material to the same extent regardless of the thickness of the core material.

The twist coefficient of the core material is preferably 0 or more, and more preferably greater than 0. The twist coefficient of the core material is preferably 200 or less, more preferably 100 or less, still more preferably less than 50.

The twist coefficient of the core material is preferably 0 or more, more preferably more than 0, and preferably 200 or less, more preferably 100 or less, and further more preferably less than 50.

[Formula 1]

$$K = T/\sqrt{T/10000/D} \quad (A)$$

In the formula (A), K is a twist coefficient, T is a twist number (unit: [times/m]), and D is a fineness (unit: [dtex]).

From the viewpoint of adhesive force, the filament constituting the core material is preferably a chemical fiber, and particularly preferably polyester or nylon. The chemical fiber is less likely to fluff and distort. Therefore, when the filament constituting the core material is a chemical fiber, a starting point of debonding is less likely to occur, and the excellent adhesive force is exhibited.

In addition, the filament constituting the core material may be a hollow yarn. The hollow yarn is typically rich in flexibility in the thickness direction and is easily deformed, and thus the core material obtained by using the hollow yarn is also rich in flexibility in the thickness direction and is also easily deformed.

Thus, the use of a hollow yarn for the filament forming the core material allows for easily causing the above-mentioned deformation like crush of the core material. When the flexibility of the core material is high, stress is likely to be dispersed due to deformation of the core material when a force is applied in a direction in which the adherends allowed to bond with the adhesive article is debonded, so that stress is less likely to be applied to the interface (adhesive surface) between the adhesive article and the adherend, and debonding is less likely to occur. In view of the above, the use of a hollow yarn for the filament forming the core material allows for achieving an adhesive article having particularly excellent adhesive force.

Since the hollow yarn is usually brittle, the hollow yarn is preferably used without twisting when the hollow yarn is used for the filament forming the core material.

In order to reduce the environmental load, the yarn-like adhesive body preferably contains a biomass-derived component.

In the present specification, the biomass-derived component refers to a component derived from a renewable organic resource. Typically, the biomass-derived component refers to a component derived from biological resources that can be continuously reproduced in the presence of sunlight, water and carbon dioxide. Thus, components derived from fossil resources (fossil resource-based materials) that are depleted by use after mined are excluded. For example, the plant-derived component is the biomass-derived component.

The non-biomass derived component refers to a component other than the biomass-derived component.

The biomass degree is, for example, used as an index of the content rate of the biomass-derived component of the yarn-like adhesive body.

The biomass degree of the yarn-like adhesive body is the ratio of the weight of the biomass-derived component contained in the yarn-like adhesive body to the total weight of the yarn-like adhesive body, and is calculated by the following formula. The same applies to the biomass degree of the core material and the adhesive, and each of the biomass degrees is calculated by the following formula.

The biomass degree [%] of the yarn-like adhesive body=100×(the weight [g] of the biomass-derived component contained in the yarn-like adhesive body)/(the total weight [g] of the yarn-like adhesive body)

The biomass degree [%] of the core material=100×(the weight [g] of the biomass-derived component contained in the core material)/(the total weight [g] of the core material)

The biomass degree [%] of the adhesive=100×(the weight [g] of the biomass-derived component contained in the adhesive)/(the total weight [g] of the adhesive) The biomass degree can be measured according to ASTM D6866-18.

The biomass degree of the yarn-like adhesive body is preferably 10% or more, more preferably 25% or more, further more preferably 35% or more, still more preferably 50% or more, still more preferably 70% or more, still more preferably 90% or more, and most preferably 100% from the viewpoint of reducing the environmental load. The biomass degree of the yarn-like adhesive body can be adjusted by adjusting the biomass degree of the core material and/or the adhesive layer.

On the other hand, an excessive increase of the biomass degree of the core material and the adhesive layer for improving the biomass degree of the yarn-like adhesive body may incur a risk that strength and flexibility are reduced, adhesive force is reduced, and producing cost is increased. Therefore, the biomass degree of the yarn-like adhesive body is preferably 95% or less, more preferably 90% or less, and further more preferably 80% or less.

As a method of increasing the biomass degree of the yarn-like adhesive body, a method of improving the biomass degree of the core material and a method of improving the biomass degree of the adhesive layer may be considered. However, increasing the biomass degree of the adhesive layer may decrease the adhesive force and may increase a producing cost. Therefore, it is particularly preferable to increase the biomass degree of the core material for increasing the biomass degree of the yarn-like adhesive body.

Examples of the material of the core material containing the biomass-derived component include natural fibers. Examples of natural fibers include plant fibers such as hemp and animal fibers such as silk and wool.

Examples of the material of the core material containing the biomass-derived component include biomass plastics. Biomass plastics are roughly classified into those composed of biomass-derived components, those composed of biomass-derived components and fossil resource-derived components.

Examples of biomass plastics composed of biomass-derived components include polylactic acid, polyethylene (BioPE), nylon 11 (BioPA 11), nylon 1010 (BioPA 1010), and polyester (BioPEs).

Examples of biomass plastics composed of biomass-derived components and fossil resource-derived components include polyethylene terephthalate (BioPET) containing biomass-derived components, polybutylene succinate (BioPBS), polybutylene terephthalate succinate, polyamide 610, 410, 510, 1012, 10T, and 11T, MXD10 (BioPA610, 410, 510, 1012, 10T, 11T, MXD10), polycarbonate (BioPC), polyurethane (BioPU), aromatic polyester, unsaturated polyester, phenolic resin, epoxy resin, polylactic acid blended PBAT, starch blended polyester resin.

From the viewpoint of reducing the environmental load, the biomass degree of the core material is preferably 25% or more, more preferably 50% or more, further more preferably 70% or more, and most preferably 100%.

On the other hand, an excessive increase of the biomass degree of the core material may incur a risk that strength and flexibility are reduced, adhesive force is reduced, and producing cost is increased. Therefore, the biomass degree of the core material is preferably 95% or less, more preferably 80% or less, and further more preferably 70% or less.

Further, in order to reduce the environmental load, it is also preferable that the core material in the yarn-like adhesive body contain a recycled resin. In the present specification, the recycled resin is a resin obtained by recycling a resin product, and examples thereof include a resin obtained by material recycling and chemical recycling.

Material recycling represents that a resin product such as a waste plastic is subjected to a process such as crushing, dissolution and then is recycled as a raw material of a resin product.

Chemical recycling represents that petroleum raw materials or the like are obtained by chemically decomposing a resin product such as the waste plastic, to be raw materials or monomers, or by blast furnace reducing agents, coke oven chemical raw materials, gasification, oiling, or the like, and then reused as raw materials for resin products.

The type of the recycled resin is not limited, but may be appropriately selected according to the required properties such as strength, mass, and hardness. Examples include materials containing polymeric materials such as various thermoplastic polymers, thermosetting polymers and rubber. Various types of polymer materials such as rayon, cupra, acetate, promix, nylon, aramid, vinylon, vinylidene, polyvinyl chloride, polyester, aryl, polyolefins such as polyethylene (PE), polypropylene (PP), ethylene/propylene copolymers and ethylene/vinyl acetate copolymers, polyester resins such as polyethylene terephthalate (PET), vinyl chloride resins, vinyl acetate resins, polyimide resins, polyamide resins, fluororesins, polyurethane, polyclar, polylactic acid; various rubbers such as natural rubber and synthetic rubber such as polyurethane; foam such as foamed polyurethane and foamed polychloroprene rubber; or the like can be used. A polyester resin is preferred, and polyethylene terephthalate (PET) is more preferred.

The recycled resin may include a resin that has not been recycled, that is, a commercially available polymer or a newly synthesized polymer. The type of resin that has not been recycled is not limited, but examples thereof includes materials including polymeric materials such as thermoplastic polymers, thermosetting polymers, and rubber. The thermoplastic polymers are preferred, the same type resins as the above-mentioned recycled resins are preferred, polyester resins are preferred, and polyethylene terephthalate (PET) is more preferred.

The content of the recycled resin in the core material is preferably 70 mass % or more, more preferably 80 mass % or more, and further more preferably 95 mass % or more from the viewpoint of reducing the environmental load.

When the core material is a multifilament yarn, all the filaments constituting the multifilament yarn may contain a biomass-derived component and/or a recycled resin (hereinafter, also referred to as "biomass-derived component and the like"), and some of the filaments may contain a biomass-derived component and the like and other filaments do not have to contain biomass-derived component and the like. By adjusting the ratio of the number of filaments including a biomass-derived component and the like to the number of all filaments constituting the multifilament yarn, various properties such as the content ratio of the biomass-derived component and the strength can be easily adjusted.

[Member, Bonded body, and Method of Producing Bonded body] The shape of the bonding region is not limited as long as at least a part of the shape of the bonding region is bent. Examples of the shape of the bonding region include a frame-like shape along the outer frame of the bonding surface (the surface facing the other article in the bonded body) of one article. For example, when a cover glass of a display or a cover glass of a camera of articles such as a smartphone is allowed to bond to a frame member, the above shape of a bonding region is required.

Although the type of the member allowed to be bonded is not limited, but the member is preferably a member constituting the electronic device as the shape of the bonding region is required to be narrowed and complicated when the parts of the electronic device are allowed to bond to each other.

Examples of the member constituting the electronic device include various wire members (linear members) such as cables such as electric wires and optical fibers, optical fiber sensors such as LED fiber lights and fiber bragg gratings (FBG), in addition to the above cover glass and the frame member. When these members are stuck and fixed to other members in a state in which these members are bent, the shape of the bonding region becomes a bending shape having a narrow width according to the shape of the linear member.

In the method of producing the bonded body of the present embodiment, it is preferable to first allow a yarn-like adhesive body to bond to one member, and then allow another member to bond thereto. The method of allowing the yarn-like adhesive body to bond to the member is not limited, but the method can be performed with a machine for bonding (bonding apparatus), or may be performed manually. The yarn-like adhesive body may be allowed to bond to a temporary support once and then transferred to the member.

In addition, in the bonding of the members (that is, the producing of the bonded body), yarn-like adhesive bodies may be used, but only one adhesive body is preferably used from the viewpoint of reducing the number of steps.

EXAMPLES

Hereinafter, the present invention will be specifically described with reference to Examples, but the present invention is not limited to these Examples.

Example 1

(Preparation of Aqueous Dispersion Type Acrylic Adhesive)

40 parts by weight of ion-exchanged water were added to a reaction vessel equipped with a cooling pipe, a nitrogen introduction pipe, a thermometer and a stirrer, and the water was stirred at 60° C. for 1 hour or more while introducing nitrogen gas, thereby performing nitrogen substitution. 0.1 parts by weight of 2,2'-azobis[N-(2-carboxyethyl)-2-methylpropionamidine] n hydrate (polymerization initiator) were added to the reaction vessel. Monomer emulsion A was gradually dropped to the reaction vessel over 4 hours while maintaining the system at 60° C., thereby promoting emulsion polymerization reaction.

The monomer emulsion A used was an emulsion obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (manufactured by Shin-Etsu Chemical Co., Ltd., trade name "KBM-503") and 2 parts by weight of polyoxyethylene lauryl sodium sulfate (emulsifier) to 30 parts by weight of ion-exchanged water, followed by emulsifying. After completion of dropwise addition of the monomer emulsion A, the resulting mixture was maintained at 60° C. for 3 hours, and the system was cooled to room temperature. The pH of the mixture was then adjusted to 7 by adding 10% ammonia water. Thus, an acrylic polymer emulsion (aqueous dispersion type acrylic polymer) was obtained. 20 parts by weight of a tackifying resin emulsion based on a solid content (manufactured by Arakawa Chemical Industries, Ltd., trade name "E-865NT") per 100 parts by weight of the acrylic polymer contained in the acrylic polymer emulsion were added. Furthermore, the pH was adjusted to 7.2 and viscosity was adjusted to 10 Pa·s with 10 mass % ammonia water as a pH regulator and polyacrylic acid (manufactured by Toagosei Co., Ltd., trade name "ARON B-500") as a thickener. Thus, an aqueous dispersion type acrylic adhesive composition for adhesive layer was obtained.

(Producing of Yarn-Like Adhesive Body)

A multifilament yarn (280 dtex) in which 48 polyester yarns (filaments) were twisted at 150 times/m was used as a core material. The aqueous dispersion type acrylic adhesive was coated on the core material by dipping such that the adhesion amount of the adhesive in the obtained adhesive article was 22 mg/m, and followed by drying at 80° C. for 5 minutes to form the adhesive layer, thereby the yarn-like adhesive body of Example 1 was obtained.

(Producing of Bonded Body and Evaluation of Adhesive Force)

The first member and the second member as described below were prepared.

First member: A rectangular acrylic plate having a short side of 50 mm, a long side of 60 mm, and a thickness of 3 mm Second member: A rectangular polycarbonate resin plate having a short side of 80 mm, a long side of 110 mm, and a thickness of 10 mm and having a rectangular slit (a short side of 30 mm, a long side of 40 mm) in the center.

As shown in a perspective view in FIG. 2 and a cross-sectional view taken along the line X-X of FIG. 2 in FIG. 3, the obtained yarn-like adhesive body 23 (not shown in FIG. 2) was stuck along the peripheral edge of one surface of the first member 22A, and the first member 22A and the second member 22B were allowed to bond to each other such that the center of the first member 22A and the center of the slit of the second member 22B coincided with each other, and were pressure-bonded at 2 kg for 10 seconds to obtain a bonded body.

Next, the second member 22B was fixed and, as shown in FIG. 3, a load was applied to the center of the first member 22A through the slit in a direction in which the first member 22A and the second member 22B were separated, a maximum load observed until the first member 22A and the second member 22B were separated was measured, and the measurement result was 27 N/22 cm.

Comparative Example 1

(Producing of Adhesive Body by Cutting Adhesive Film)

A center portion of the double-sided adhesive film (a short side of 50 mm, a long side of 60 mm, a thickness of 0.2 mm)

having both surfaces protected by a separator was cut to obtain a frame-shaped adhesive body of Comparative Example 1 having a width of 0.3 mm.

The weight of the obtained frame-shaped adhesive body was 0.01 mg, whereas the total weight of the discarded portion (separator and the cut adhesive film) was 0.75 mg. That is, about 98% of the total weight was discarded.

(Producing of Bonded Body and Evaluation of Adhesive Force)

A bonded body was obtained in the same manner as in Example 1 except that the adhesive body of Comparative Example 1 was used instead of the yarn-like adhesive body of Example 1.

Next, the maximum load observed until the first member and the second member were separated was measured in the same manner as in Example 1, and the measurement result was 32 N/22 cm.

In Comparative Example 1, the adhesive force of the first member and the second member was high, and the bonded body in which the shape of the bonding region was bent (frame shape) was obtained, but the discarded portion was large in the producing process of the adhesive body.

In Example 1, the adhesive force of the first member and the second member was at the same level as in Comparative Example 1, and a bonded body in which the shape of the bonding region was bent (frame shape) was obtained. In addition, no discarded portion was generated in the producing process of the adhesive body.

Although the preferred embodiments of the present invention have been described above, the present invention is not limited to the above-described embodiment, and various modifications and substitutions can be added to the above-described embodiment without departing from the scope of the present invention.

This application is based on Japanese Patent Application No. 2018-190115 filed on Oct. 5, 2018, Japanese Patent Application No. 2019-179324 filed on Sep. 30, 2019, the contents of which are incorporated by reference.

REFERENCE SIGNS LIST 1, 11 Bonded body
2A, 2B, 12A, 12B, 22A, 22B Member
3, 13, 23 Yarn-like adhesive body
4 Bonding region

The invention claimed is:

1. A method of producing a bonded body comprising,
bonding members to each other with a yarn-like adhesive body, wherein
the yarn-like adhesive body comprises a twisted multi-filament core material having a cross-sectional shape that is at least one of circular or elliptical,
at least a part of a bonding region, which is a portion where the members are bonded to each other, has a bent shape,
the members are bonded to each other with the yarn-like adhesive body bent according to a shape of the bonding region, and
a twist coefficient K of the twisted multi-filament core material is 0 or more and 200 or less,
wherein
K is the twist coefficient, T is a quantity of twists per meter of the twisted multi-filament core material, and D is a fineness of a multi-filament yarn included in the twisted multi-filament core material.

2. The method of producing a bonded body according to claim 1, wherein
the yarn-like adhesive body has an adhesive force of 5 N/22 cm or more measured in accordance with an adhesive force measurement test comprising:
providing a rectangular acrylic plate having a short side of 50 mm, a long side of 60 mm, and a thickness of 3 mm, and a rectangular polycarbonate resin plate having a short side of 80 mm, a long side of 110 mm, and a thickness of 10 mm, the rectangular polycarbonate resin plate having a rectangular slit with a short side of 30 mm, and a long side of 40 mm in the center;
sticking the yarn-like adhesive body along a peripheral edge of one surface of the rectangular acrylic plate;
press-bonding, for 10 seconds at 2 kg, the rectangular acrylic plate and the rectangular polycarbonate resin plate with the yarn-like adhesive body to bond the rectangular acrylic plate and the rectangular polycarbonate resin plate to each other with the center of the rectangular acrylic plate aligned with the center of the slit of the rectangular polycarbonate resin plate; and
applying a load to the center of the rectangular acrylic plate through the slit until the rectangular acrylic plate and the rectangular polycarbonate resin plate, having been bonded to each other by the yarn-like adhesive body, are separated; and
measuring the load applied to the center of the rectangular acrylic plate until the rectangular acrylic plate and the rectangular polycarbonate resin plate are separated,
wherein
the load when the rectangular acrylic plate and the rectangular polycarbonate resin plate are separated is a maximum load, and
the maximum load is the adhesive force.

3. The method of producing the bonded body according to claim 1, wherein the members are components of an electronic device.

4. A bonded body, comprising:
members bonded to each other with a yarn-like adhesive body,
wherein
the yarn-like adhesive body comprises a twisted multi-filament core material having a cross-sectional shape that is at least one of circular or elliptical,
at least a part of a bonding region, which is a portion where the members are bonded to each other, has a bent shape,
the members are bonded to each other with the yarn-like adhesive body bent according to a shape of the bonding region, and
a twist coefficient K of the twisted multi-filament core material is 0 or more and 200 or less,
wherein
K is the twist coefficient, T is a quantity of twists per meter of the twisted multi-filament core material, and D is a fineness of a multi-filament yarn included in the twisted multi-filament core material.

5. The bonded body according to claim 4, wherein
the yarn-like adhesive body has an adhesive force of 5 N/22 cm or more measured in accordance with an adhesive force measurement test comprising:
providing a rectangular acrylic plate having a short side of 50 mm, a long side of 60 mm, and a thickness of 3 mm, and a rectangular polycarbonate resin plate having a short side of 80 mm, a long side of 110 mm, and a thickness of 10 mm, the rectangular polycarbonate resin plate having a rectangular slit with a short side of 30 mm, and a long side of 40 mm in the center;

sticking the yarn-like adhesive body along a peripheral edge of one surface of the rectangular acrylic plate;

press-bonding, for 10 seconds at 2 kg, the rectangular acrylic plate and the rectangular polycarbonate resin plate with the yarn-like adhesive body to bond the rectangular acrylic plate and the rectangular polycarbonate resin plate to each other with the center of the rectangular acrylic plate aligned with the center of the slit of the rectangular polycarbonate resin plate; and applying a load to the center of the rectangular acrylic plate through the slit until the rectangular acrylic plate and the rectangular polycarbonate resin plate, having been bonded to each other by the yarn-like adhesive body, are separated; and measuring the load applied to the center of the rectangular acrylic plate until the rectangular acrylic plate and the rectangular polycarbonate resin plate are separated, wherein the load when the rectangular acrylic plate and the rectangular polycarbonate resin plate are separated is a maximum load, and the maximum load is the adhesive force.

6. The bonded body according to claim 4, wherein the members are components of an electronic device.

7. The bonded body according to claim 4, wherein the cross-sectional shape of the twisted multi-filament core material is circular.

8. The bonded body according to claim 4, wherein the cross-sectional shape of the twisted multi-filament core material is elliptical.

9. The bonded body according to claim 4, wherein the cross-sectional shape of the twisted multi-filament core material is partially circular and partially elliptical.

10. The bonded body according to claim 4, wherein the yarn-like adhesive body comprises an adhesive layer covering a peripheral surface of the twisted multi-filament core material.

11. The bonded body according to claim 4, wherein the twisted multi-filament core material comprises 4 or more filaments.

12. The bonded body according to claim 4, wherein the yarn-like adhesive body comprises a recycled resin.

* * * * *